(12) United States Patent
Minamoto et al.

(10) Patent No.: US 7,997,949 B2
(45) Date of Patent: Aug. 16, 2011

(54) EXTERNAL-ELECTRODE DISCHARGE LAMP WITH NO LIGHT LEAKAGE FROM EXTERNAL ELECTRODE PORTION

(75) Inventors: Maki Minamoto, Shinagawa-ku (JP); Seiichiro Fujioka, Shinagawa-ku (JP)

(73) Assignee: NEC Corporation, Tokyo (JP)

( * ) Notice: Subject to any disclaimer, the term of this patent is extended or adjusted under 35 U.S.C. 154(b) by 88 days.

(21) Appl. No.: 12/557,033

(22) Filed: Sep. 10, 2009

(65) Prior Publication Data

US 2010/0056011 A1   Mar. 4, 2010

Related U.S. Application Data

(62) Division of application No. 10/994,288, filed on Nov. 23, 2004, now Pat. No. 7,605,541.

(30) Foreign Application Priority Data

| Nov. 25, 2003 | (JP) | 2003-393743 |
| Jun. 22, 2004 | (JP) | 2004-183699 |
| Nov. 1, 2004 | (JP) | 2004-317780 |

(51) Int. Cl.
*H01J 9/00* (2006.01)
(52) U.S. Cl. .......................... 445/29; 313/594
(58) Field of Classification Search ............ 445/29; 313/594–597
See application file for complete search history.

(56) References Cited

U.S. PATENT DOCUMENTS

| 5,013,966 A | 5/1991 | Saikatsu et al. |
| 5,238,518 A | 8/1993 | Okubi et al. |
| 5,514,934 A | 5/1996 | Matsumoto et al. |
| 6,674,250 B2 | 1/2004 | Cho et al. |
| 6,984,056 B2 | 1/2006 | Amano et al. |
| 2005/0134183 A1 | 6/2005 | Park |

FOREIGN PATENT DOCUMENTS

| JP | H08-273625 A | 10/1996 |
| JP | 105991 A | 1/1998 |
| JP | H11-040109 A | 2/1999 |
| JP | 2000141078 A | 5/2000 |
| JP | 20028408 A | 1/2002 |
| JP | 2003-017005 A | 1/2003 |
| JP | 2003-229092 A | 8/2003 |
| JP | 2003-257377 A | 9/2003 |
| JP | 2004-079267 A | 3/2004 |
| JP | 2004-146351 A | 5/2004 |
| JP | 2005-5265 | 1/2005 |

(Continued)

OTHER PUBLICATIONS

English translation of JP 2000-141078.*

(Continued)

*Primary Examiner* — Anne M Hines
(74) *Attorney, Agent, or Firm* — Sughrue Mion, PLLC (57) ABSTRACT

An external-electrode discharge lamp has a light-permeable, electrically insulative outer casing having a closed hollow space defined therein. A discharge medium is sealed in the outer casing. An external electrode is disposed on an outer surface of the outer casing for causing a dielectric barrier discharge in the discharge medium. The external electrode comprises a plate of an electrically conductive material and is brazed to the outer surface of the outer casing by a brazing material disposed fully circumferentially on the outer surface of the outer casing.

3 Claims, 9 Drawing Sheets

FOREIGN PATENT DOCUMENTS

| | | |
|---|---|---|
| KR | 2001-72364 A | 7/2001 |
| KR | 2001-98317 A | 11/2001 |
| KR | 2002-4983 A | 1/2002 |
| KR | 2003-44870 | 6/2003 |
| TW | 431931 B | 5/2001 |
| TW | 554368 B | 9/2003 |

OTHER PUBLICATIONS

English translation of JP 2004-079267.*

* cited by examiner

Fig. 9B inner diameter is smaller than outer diameter of a glass bulb

EXTERNAL-ELECTRODE DISCHARGE LAMP WITH NO LIGHT LEAKAGE FROM EXTERNAL ELECTRODE PORTION

This application is a divisional application of U.S. application Ser. No. 10/994,288 filed Nov. 23, 2004 which claims priority based on Japanese Patent Application No. 2003-393743 filed Nov. 25, 2003, Japanese Patent Application No. 2004-183699 filed Jun. 22, 2004, and Japanese Patent Application No. 2004-317780 filed Nov. 1, 2004. The entire disclosures of the prior applications are hereby incorporated by reference.

BACKGROUND OF THE INVENTION

1. Field of the Invention

The present invention relates to an external-electrode discharge lamp, and more particularly to an external-electrode discharge lamp for use as the light source of a backlight for a liquid crystal display device having a relatively large screen size and a method of manufacturing such an external-electrode discharge lamp.

2. Description of the Related Art

Discharge lamps are used as the light source of backlights for liquid crystal display devices in one of their applications. A backlight serves to illuminate a liquid crystal display panel from its back. From the standpoint of the layout of a discharge lamp as a light source, backlights are generally classified into a so-called edge-light type and a so-called direct type. The edge-light backlight design includes a discharge lamp as a light source disposed outwardly of an edge of the liquid crystal display panel. In the edge-light backlight design, light emitted from the discharge lamp is guided by a light guide plate to the back of the liquid crystal display panel. The direct-type backlight includes a discharge lamp as a light source disposed behind the liquid crystal display panel. In the direct-type backlight, light emitted from the discharge lamp is directly applied to the back of the liquid crystal display panel.

Liquid crystal display panels are used in various applications in terms of screen sizes. In some applications, e.g., cellular phone terminals and laptop personal computers, liquid crystal display panels that are used can be of a relatively small screen size. In other applications, e.g., liquid crystal television receivers, the screen sizes of liquid crystal display panels that are used may be preferably as large as possible. Liquid crystal display panels in the former applications where the screen sizes can be smaller are often combined with an edge-light backlight unit which employs a cold-cathode discharge lamp as a light source. On the other hand, liquid crystal display panels in the latter applications where the screen sizes should be greater are often combined with a direct-type backlight which has a light source comprising an external-electrode mercury fluorescent lamp.

Large-screen liquid crystal display panels are associated with a direct-type backlight for the following reasons: Liquid crystal television receivers that are required to have larger screen sizes need to have the screen luminance increased, and hence the backlight combined therewith is required to have increased luminance. For increasing the luminance of the backlight, the number of lamps used as light sources needs to be increased. If the number of lamps in the edge-light backlight is increased, then many lamps are stacked, resulting in an increase in the thickness of the display panel. If the number of lamps in the direct-type backlight is increased, then since many lamps are placed in a planar array, the thickness of the display panel remains unchanged though the number of lamps used is large. For this reason, the direct-type backlight is advantageously effective to keep large-screen liquid crystal display panels low in profile.

The backlight for large-screen liquid crystal display panels employs an external-electrode discharge lamp for the following reasons: Generally, discharge lamps exhibit negative current vs. voltage characteristics, which are corrected into positive current vs. voltage characteristics by a capacitor called a ballast capacitor. If the number of cold-cathode discharge lamps is increased, then the number of ballast capacitors also needs to be increased depending on the number of cold-cathode discharge lamps. As a result, a power supply for turning on the lamps becomes larger in size and more expensive to manufacture. The external-electrode discharge lamp has an outer casing such as a glass bulb acting as a ballast capacitor, and hence, so to say, has a capacitor itself. Carrying logic to extreme, it is not necessary for each external-electrode discharge lamp to have a dedicated ballast capacitor, and even if the number of external-electrode discharge lamps used is increased, a power supply for turning them on does not need to be substantially increased in size.

Figure 1A:
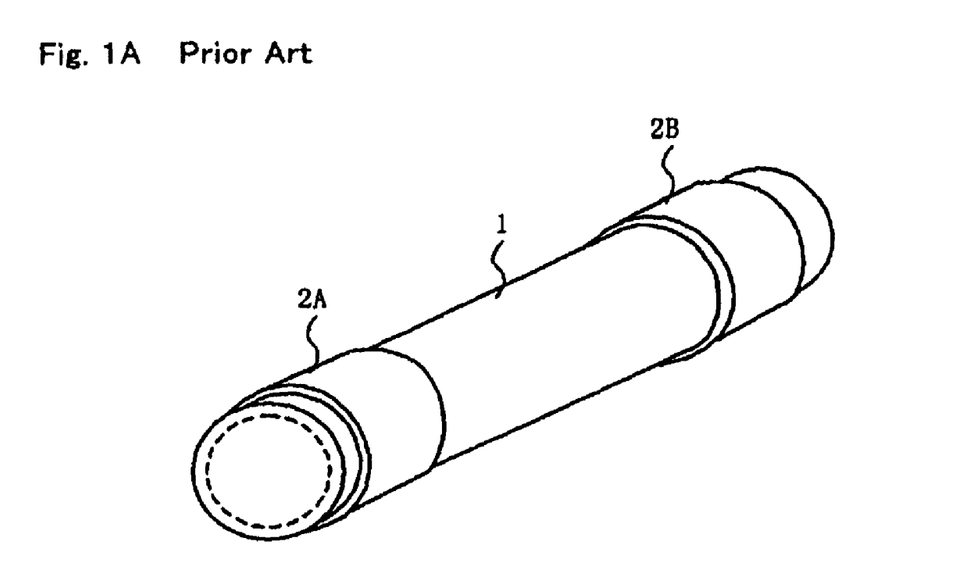
FIG. 1A is a perspective view of a conventional external-electrode discharge lamp.
Figure 1B:
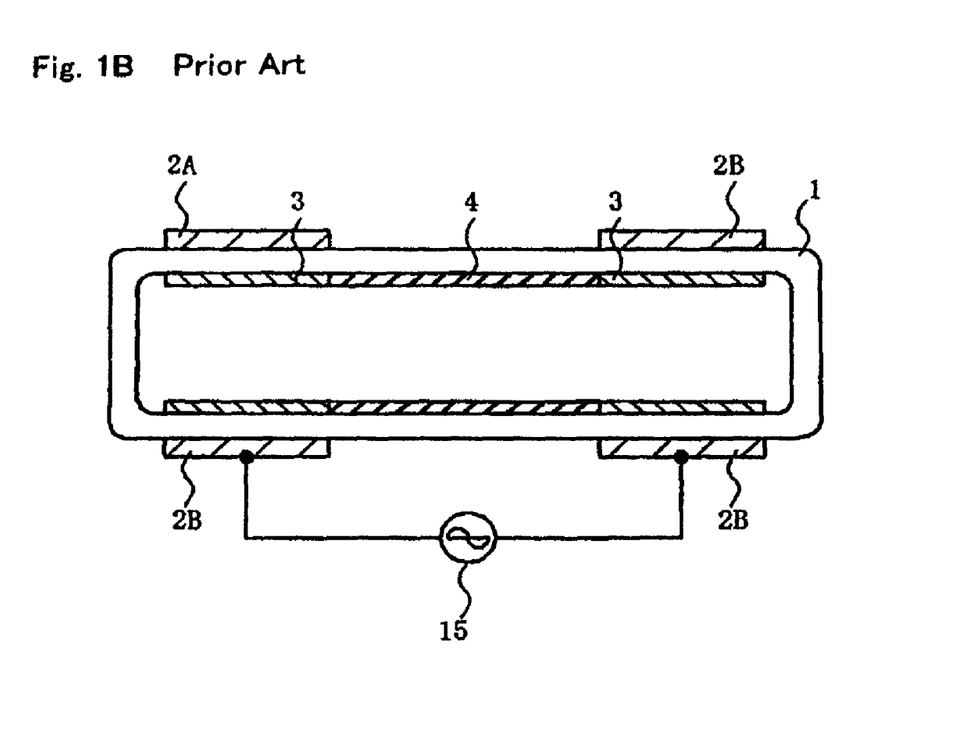
FIG. 1B is a longitudinal cross-sectional view of the external-electrode discharge lamp shown in FIG. 1A.

FIGS. 1A and 1B of the accompanying drawings show a basic structure of a conventional external-electrode discharge lamp. The conventional external-electrode discharge lamp is a mercury fluorescent lamp having cylindrical glass bulb 1. Glass bulb 1 is made of borosilicate glass, for 5 example. The external-electrode discharge lamp has external electrodes 2A, 2B mounted on the respective outer surfaces of opposite ends of glass bulb 1, and they are electrically insulated from each other. Glass bulb 1 is hollow and has a closed space (discharge chamber) defined therein. The discharge chamber is filled with a gas serving as a discharge medium, e.g., a mixed gas of xenon and mercury vapor or a mixture of such a mixed gas and another rare gas such as argon, neon, or the like, under a pressure ranging from $1.3 \times 10^3$ to $40 \times 10^3$ Pa (10 through 300 Torr).

Basic components involved in developing an electric discharge are above-mentioned glass bulb 1, the gas as the discharge medium, and external electrodes 2A, 2B. In addition, the external-electrode discharge lamp also has fluorescent layer 4 disposed on the inner surface of glass bulb 1 which faces the discharge chamber. Fluorescent layer 4 serves to convert ultraviolet radiation produced in glass bulb 1 by an electric discharge into light having other wavelengths, such as visible light. Protective layers 3 are also disposed on respective portions of the inner surface of glass bulb 1 underneath external electrodes 2A, 2B. Protective layers 3 serve to protect the inner surface of glass bulb 1, and are made of a metal oxide such as yttrium oxide, for example.

The external-electrode discharge lamp thus constructed operates as follows: External power supply 15 applies AC electric power having a frequency ranging from 10 to 100 kHz and a voltage ranging from 1 to 10 kV, for example, between external electrodes 2A, 2B, generating a dielectric barrier discharge in the discharge chamber with the wall of glass bulb 1 serving as a dielectric. Ultraviolet radiation caused by the dielectric barrier discharge excites fluorescent layer 4. When excited, fluorescent layer 4 emits light. In this manner, the ultraviolet radiation is converted into light having other wavelengths. The converted light is radiated out of the external-electrode discharge lamp through glass bulb 1.

Heretofore, it is known that external electrodes 2A, 2B are made of metal foil such as aluminum foil or copper foil and bonded to the glass bulb 1 by an adhesive (see, for example, Japanese laid-open patent publication No. H11-040109, paragraph [0023] and Japanese laid-open patent publication No. 2003-229092, paragraphs [0027], [0032] through [0035], [0037], [0043], FIG. 3).

Japanese laid-open patent publication No. H11-040109 also discloses the use of a thin metal film as the external electrodes. The thin metal film is formed by a physical deposition process such as sputtering or vacuum evaporation. This publication also reveals a process of coating the outer surface of the glass bulb with an electrically conductive paste and drying the electrically conductive paste into external electrodes. Printing or dipping is used to coat the glass bulb with the electrically conductive paste.

Each of the external electrodes disclosed in Japanese laid-open patent publication No. H11-040109 is in the form of an electrically conductive thin film. Other known external electrodes in the form of an electrically conductive thin film are formed as a plated metal layer or formed by winding a metal foil around a glass bulb. It is also known to fabricate a metal tape by coating one surface of a metal foil with a tackiness agent or an adhesive, and wind the metal tape around a glass bulb.

External-electrode discharge lamps for use as the backlight for a large-screen liquid crystal display panel are required to produce high luminance, as described above. Therefore, a large discharge current necessarily flows in the external-electrode discharge lamps, and a large amount of heat is inevitably produced thereby. Since the electrically conductive thin film used as the external electrodes have a limited heat radiation capability, a vicious cycle occurs which is successively made up of an increase in the temperature of the glass bulb, a reduction in the insulation of the glass bulb, an increase in the current, an increase in the amount of generated heat, and a further increase in the temperature of the glass bulb. As a consequence, holes tend to be formed in the glass bulb beneath the external electrodes.

An electrically conductive thin film for use as an external electrode is likely to be fabricated according to a complex production process and hence at a high cost. If a thin metal film deposited by sputtering or vacuum evaporation is formed as an external electrode, then a mask needs to be formed in a shape depending on the shape of the external electrode, or the thin metal film needs to be etched after it has been grown. If an electrically conductive paste is employed, then it has to be applied and then dried. If a metal foil is bonded by a tackiness agent or an adhesive, then a processing step is required to apply the tackiness agent or the adhesive to only a required area. If a metal foil is to be wound around a glass bulb or a metal tape formed by coating one surface of a metal foil with a tackiness agent or an adhesive is to be wound around a glass bulb, then a processing step of winding the metal foil or the metal tape is required.

It has been proposed to place a ring formed from a relatively thick member such as a metal plate over a glass bulb from one end thereof for use as an external electrode. The use of such a ring as an external electrode simplifies the process of forming an external electrode. Further, the external electrode is considerably thick so that it has a better heat radiating capability. Examples of a discharge lamp having a ring formed from a metal plate are disclosed in Japanese laid-open patent publication No. 2003-017005, paragraphs [0003], [0030] through [0032], FIGS. 9 and 11, Japanese laid-open patent publication No. H8-273625, paragraphs [0013] through [0015], FIG. 1, and Japanese laid-open patent publication No. 2004-079267, paragraphs [0016] through [0018], FIGS. 1 and 2.

The discharge lamp disclosed in Japanese laid-open patent publication No. 2003-017005 has a metal conductor having spring resiliency and a C-shaped cross section, which is fitted over a glass bulb axially from one end thereof for use as an external electrode. According to Japanese laid-open patent publication No. H8-273625, a resilient metal plate such as of phosphor bronze is machined into a C-shaped cross section, and fitted over a glass bulb axially from one end thereof for use as an external electrode. The relatively thick metal plate used as the external electrode has a better heat radiating capability. Furthermore, the discharge lamp can efficiently be manufactured because the external electrode can be produced simply by fitting the C-shaped member, formed from the metal plate having spring resiliency, over the glass bulb from one end thereof.

However, simply fitting the C-shaped metal ring over the glass bulb tends to cause irregular contact between the glass bulb and the ring. As a consequence, the glass bulb and the external electrode are not held in full effective surface-to-surface contact with each other, but held in contact with each other through a small effective area, resulting in a reduced amount of electric power applied to the discharge lamp. In addition, a discharge current is liable to concentrate in the area where the contact resistance is smaller. The area where the discharge current concentrates is thus trapped in a vicious cycle that is successively made up of an increase in the amount of generated heat, a reduction in the insulation of the glass bulb, a further increase in the current, and a further increase in the amount of generated heat. As a consequence, holes tend to be formed in the glass bulb beneath the external electrode.

Japanese laid-open patent publication No. 2003-017005 and Japanese laid-open patent publication No. H8-273625 disclose a technique to improve irregular contact between a glass bulb and an external electrode when a C-shaped metal ring is used as the external electrode. Specifically, a plastic electrically conductive member is wound on the outer surface of the glass bulb which will be positioned beneath the external electrode. The external electrode in the form of the C-shaped metal ring is fitted over the plastic electrically conductive member, thereby improving the irregular contact between the glass bulb and the external electrode. The plastic electrically conductive member which serves as a base for the external electrode comprises either a metal tape in the form of a metal foil whose reverse side is coated with a tackiness agent or a silver paste. With the disclosed arrangement, though the manufacturing process is complex and the manufacturing cost is high, the irregular contact between the glass bulb and the external electrode can be improved.

Japanese laid-open patent publication No. 2004-079267 discloses a technique to bond an external electrode in the form of a C-shaped metal ring to a glass bulb with an electrically conductive adhesive. Though the disclosed technique is not directly aimed at improving irregular contact between the external electrode and the glass bulb, but is expected to improve such irregular contact between the external electrode and the glass bulb.

For achieving higher luminance, i.e., a higher discharge current, for the above conventional external-electrode discharge lamps, the external electrode should preferably comprise a relatively thick metal member, rather than a thin film such as a metal foil, a metal layer deposited by sputtering or vacuum evaporation, an electrically conductive paste coating, or a plated metal layer. Particularly, it is preferable, also from the standpoint of easy production, to machine a metal plate into a C-shaped ring having spring resiliency for use as an external electrode and insert a glass bulb into the C-shaped ring to place the external electrode on the glass bulb.

One problem with the C-shaped external electrode is that light tends to leak from the gap in the C shape of the external electrode. The light leakage is fatal if the discharge lamp is used as the light source of a backlight for liquid crystal display devices because light is emitted from the edge of the liquid crystal display panel which should not be light-emitting. In addition, the radiation emitted from the gap of the external electrode, which is radiated not through the fluorescent layer of the lamp, contains many ultraviolet rays that are liable to deteriorate plastic members such as light guide plates.

Another problem is that the area of the external electrode is reduced because of the gap in the C shape thereof. If the same discharge current flows, i.e., if the same luminance is produced, the current density is greater in the external electrode and the amount of generated heat is greater with the gap than in the external electrode with no gap. However, since the area of the electrode is smaller, the heat radiating area is smaller, thereby promoting the heating of the lamp.

The structure in which the C-shaped external electrode is mounted on the glass bulb while pressing the glass bulb under its spring resiliency tends to introduce irregularities into the contact between the glass bulb and the external electrode. As described above, the irregular contact between the glass bulb and the external electrode is liable to form holes in the portion of the glass bulb beneath the external electrode.

If a C-shaped external electrode is placed over a base comprising a metal foil coated with a tackiness agent or an adhesive or a plastic electrically conductive member made of an electrically conductive tackiness agent such as a silver paste, then the contact between the glass bulb and the external electrode is more improved than if no base is used. In addition, this structure also eliminates the problem of light leakage from the gap in the C shape. However, if a metal foil is disposed on the surface of the plastic electrically conductive member as the base in the above structure, then the base and the external electrode are simply held in mechanical contact with each other. Consequently, this structure does not fully solve the problem of the irregular contact.

If the structure in which the C-shaped external electrode is fixed to the glass bulb by the electrically conductive adhesive is used for a long period of time, close contact will be lost between the external electrode and the glass bulb. The electrically conductive adhesive comprises an electrically conductive filler such as silver particles or nickel particles which are mixed with and dispersed in an organic binder such as an epoxy resin. If the electrically conductive adhesive is used to secure the external electrode to the glass bulb, the binder resin is deteriorated with time by ultraviolet rays radiated through the glass bulb. Consequently, the contact between the external electrode and the glass bulb is impaired with time. Some organic resins, such as a silicone resin, for example, are relatively highly resistant to ultraviolet rays. However, such organic resins have low bonding strength and do no provide sufficiently reliable contact between the external electrode and the glass bulb.

SUMMARY OF THE INVENTION

It is an object of the present invention to provide an external-electrode discharge lamp which is capable of eliminating light leakage from an external electrode, and a method of manufacturing such an external-electrode discharge lamp.

Another object of the present invention is to provide an external-electrode discharge lamp which is capable of suppressing irregularities in contact between an external electrode and an outer casing and preventing the contact between the external electrode and the outer casing from changing with time.

An external-electrode discharge lamp according to the present invention to achieve the above objects has a light-permeable, electrically insulative outer casing having a closed hollow space defined therein. A discharge medium is sealed in the closed hollow space defined in the outer casing. An external electrode is disposed on an outer surface of the outer casing for causing a dielectric barrier discharge in the discharge medium. The external electrode comprises a plate of an electrically conductive material and is brazed to the outer surface of the outer casing by a brazing material disposed fully circumferentially on the outer surface of the outer casing.

Another external-electrode discharge lamp according to the present invention has an external electrode which is bonded to the outer surface of the outer casing by an inorganic adhesive disposed fully circumferentially on the outer surface of the outer casing.

Still another external-electrode discharge lamp according to the present invention has a light-impermeable, electrically conductive layer, which is made of a light-impermeable, electrically conductive material, disposed fully circumferentially on a portion of the outer surface of the outer casing on which the external electrode is positioned. The external electrode is fixed to the light-impermeable, electrically conductive layer by adhesive bonding or brazing.

With the above external-electrode discharge lamps, light radiated from the outer casing is blocked by the brazing material, the inorganic adhesive, or the light-impermeable, electrically conductive layer disposed fully circumferentially on the outer surface of the outer casing. Therefore, the problem of light leakage from the external electrode portion is solved. Furthermore, since the external electrode is brazed or bonded to the outer surface of the outer casing or the light-impermeable, electrically conductive layer, irregularities in the contact between the outer casing and the external electrode are reduced, and the contact between the outer casing and the external electrode is prevented from being impaired with time.

Yet another external-electrode discharge lamp according to the present invention has a cylindrical glass bulb having a closed hollow space defined therein. A discharge medium is sealed in the glass bulb. An external electrode is disposed on an outer surface of each of opposite ends of the glass bulb for causing a dielectric barrier discharge in the discharge medium. The external electrode comprises a metal strip extending circumferentially on and around the glass bulb and having opposite ends superimposed on each other. Before the external electrode is mounted on the glass bulb, the inside diameter of the metal strip extending circumferentially on and around the glass bulb is smaller than the outside diameter of the glass bulb. Therefore, when the external electrode is mounted on the glass bulb, the external electrode presses the glass bulb and hence is fixed thereto.

Yet still another external-electrode discharge lamp according to the present invention has an external electrode which comprises a cylindrical member formed from a metal plate and having an inside diameter greater than the outside diameter of the glass bulb. The external electrode as it is mounted on the glass bulb has a protrusion projecting from an inner surface of the cylindrical member toward the glass bulb, the external electrode pressing the glass bulb under spring resiliency of the protrusion.

With the above external-electrode discharge lamps, the external electrode extends fully circumferentially on and around the portion of the outer surface of the outer casing on which the external electrode is positioned. The external electrode itself prevents light from leaking from the external electrode portion.

A further external-electrode discharge lamp according to the present invention has an external electrode which comprises a metal strip extending circumferentially on and around the glass bulb and having a C-shaped structure with opposite ends of the metal strip being spaced circumferentially from each other. The external electrode is fixed to the outer surface of the glass bulb by a brazing material disposed fully circumferentially on a portion of the outer surface of the outer casing on which the external electrode is positioned.

In the external-electrode discharge lamps according to the present invention, if the external electrode is brazed to the external electrode, then a solder material that is used should preferably comprise Sn as a chief component, 0.2 to 3.0 weight % of Sb, 0.01 to 0.1 weight % of Al, and 0.1 to 10 weight % of Ag. The solder material provides optimum wettability with respect to the external electrode and the outer casing or the glass bulb. As a result, the solder material well seeps into the gap between the inner circumferential surface of the external electrode and the outer circumferential surface of the outer casing or the glass bulb due to a capillary action, successfully forming a solder layer of substantially uniform thickness fully in the gap. If the discharge lamp with the external electrode is dipped in a solder bath of the above solder material and pulled out of the solder bath according to a dip process, then oxides attached to the surface of the external electrode are prevented from remaining on the surface of the produced solder layer, which thus advantageously has a flat surface.

The above and other objects, features, and advantages of the present invention will become apparent from the following description with reference to the accompanying drawings which illustrate examples of the present invention.

DETAILED DESCRIPTION OF THE PREFERRED EMBODIMENTS

1st Embodiment

Figure 2A:
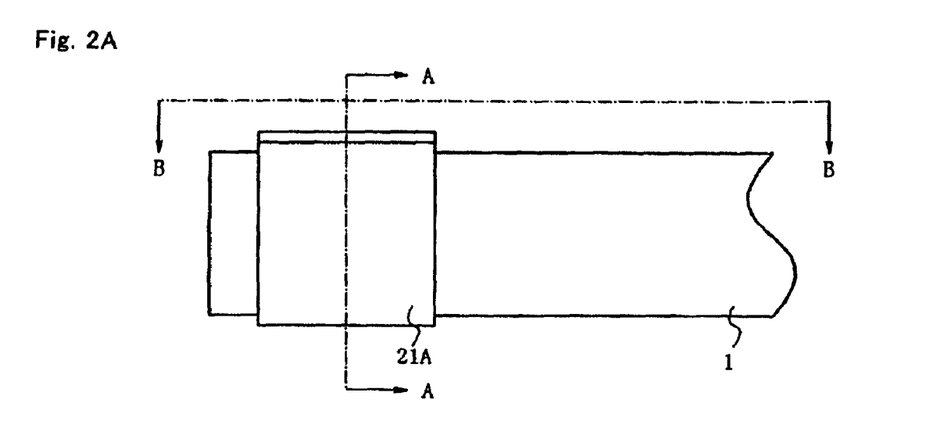
FIG. 2A is a side elevational view of an external-electrode discharge lamp according to a first embodiment of the present invention.
Figure 2B:
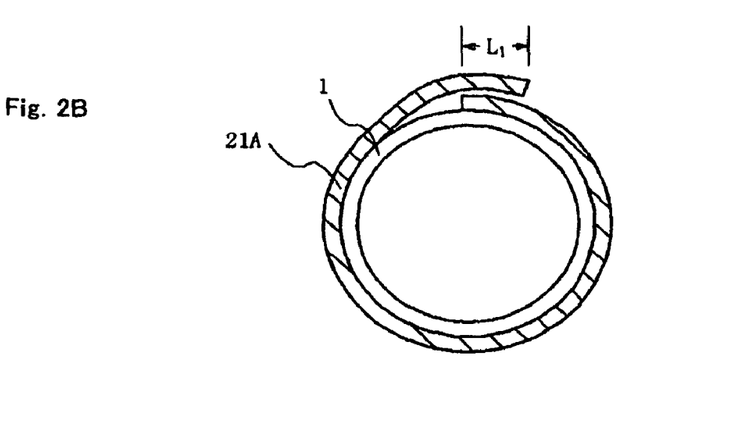
FIG. 2B is a transverse cross-sectional view of the external electrode discharge lamp shown in FIG. 2A.
Figure 2C:
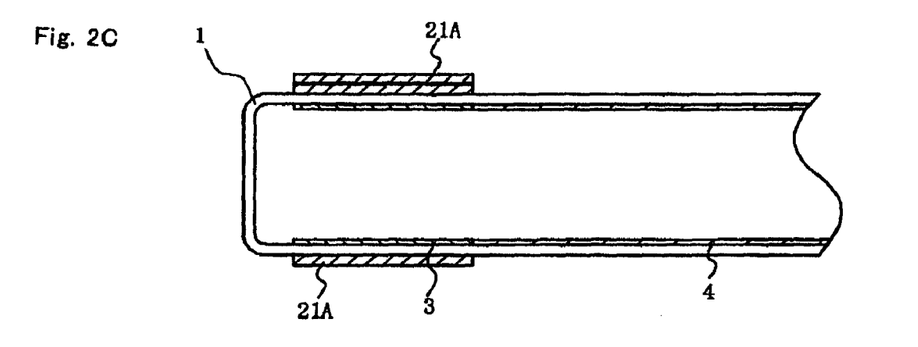
FIG. 2C is a longitudinal cross-sectional view of the external electrode discharge lamp shown in FIG. 2A.

FIG. 2A shows in side elevation an external-electrode discharge lamp according to a first embodiment of the present invention. FIG. 2B is a transverse cross-sectional view taken along line A-A of FIG. 2A, and FIG. 2C is a longitudinal cross-sectional view taken along line B-B of FIG. 2A. In FIG. 2A, only a portion of the external-electrode discharge lamp which includes one external electrode 21A on one end thereof is illustrated. However, the external-electrode discharge lamp also has another external electrode, which is identical to external electrode 21A, on the other end thereof, as with the case of conventional one shown in FIGS. 1A and 1B. In FIG. 2B, internal structural details of the external-electrode discharge lamp are omitted from illustration.

The external-electrode discharge lamp according to the first embodiment is a mercury fluorescent lamp that comprises a gas containing mercury vapor as a discharge medium and emits light with the help of a fluorescent material. The external-electrode discharge lamp has light-permeable tubular glass bulb 1 made of borosilicate glass or the like. Glass bulb 1 has a sealed discharge space defined therein which is filled with a gas serving as a discharge medium, e.g., a mixed gas of xenon and mercury vapor.

Protective layers 3 each comprising a film of yttrium oxide or the like are disposed on respective portions of the inner surface of glass bulb 1 underneath each external electrode 21A. Fluorescent layer 4 is disposed on the other portion of the inner surface of glass bulb 1. Fluorescent layer 4 may be made of a fluorescent material which is not limited to any particular type, but may be selected depending on the wavelength of light to be radiated out of glass bulb 1. Protective layer 3 and fluorescent layer 4 themselves have no direct bearing on the principles of the present invention, and the present invention is also applicable to discharge lamps which do not have protective layer 3 and fluorescent layer 4.

Structural details of external electrode 21A will be described below. According to the present embodiment, external electrode 21A is in the form of a ring formed from a rolled metal strip made of 42 alloy (Fe—Ni alloy) or Kovar (KOV). After the metal strip is machined into ring-shaped external electrode 21A, external electrode 21A is fitted over and mounted on glass bulb 1. Before external electrode 21A is placed on glass bulb 1, the inside diameter of ring-shaped external electrode 21A is smaller than the outside diameter of glass bulb 1. The circumferential length of the metal strip to be machined into ring-shaped external electrode 21A is greater than the outside diameter of glass bulb 1. When the metal strip is machined into ring-shaped external electrode 21A, one end of the metal strip and the other end thereof are superimposed on each other and radially spaced from each other by a predetermined distance. As shown in FIG. 2B, when ring-shaped external electrode 21A is mounted on glass bulb 1, the ends of the metal strip remains being superimposed on each other, with a radial gap left therebetween. The ends of the metal strip are superimposed on each other over a distance L1 which is not limited to any particular value.

In the present embodiment, ring-shaped external electrode 21A with the superimposed ends of the metal strip is spread radially outwardly to increase its inside diameter. Then, ring-shaped external electrode 21A is fitted axially over glass bulb 1 from one end thereof, and placed on glass bulb 1. After ring-shaped external electrode 21A is mounted on glass bulb 1, since its inside diameter has forcibly been increased from the initial value, ring-shaped external electrode 21A presses glass bulb 1 under the spring resiliency thereof, and securely is held on glass bulb 1.

External electrode 21A according to the present embodiment can easily be assembled on glass bulb 1 because it may simply be fitted over glass bulb 1 using its ring-shaped structure with the overlapping ends. Since external electrode 21A is of the ring-shaped structure with the overlapping ends, there is no light leaking from between the ends unlike the conventional C-shaped external electrode. External electrode 21A has a greater electrode area than the conventional C-shaped external electrode for reducing the amount of heat thereby, providing a greater heat radiating area, and thus suppressing a temperature increase.

In the present embodiment, external electrode 21A is made of 42 alloy or KOV. As the coefficients of thermal expansion of 42 alloy and KOV are close to the coefficient of thermal expansion of glass bulb 1, external electrode 21A made of 42 alloy or KOV is effective to reduce stresses developed in glass bulb 1 due to heat. Though the material of external electrode 21A is not limited to 42 alloy or KOV in the present invention, the coefficient of thermal expansion of external electrode 21A should preferably be substantially equal to the coefficient of thermal expansion of glass bulb 1 for preventing glass bulb 1 from being damaged.

Although not shown, the inner circumferential surface of external electrode 21A, which faces the outer circumferential surface of glass bulb 1, should preferably be plated with a metal layer by a flash plating process, for example, for rust prevention. If external electrode 21A is made of 42 alloy or KOV, then since these alloys contain iron (Fe), plating external electrode 21A is highly advantageous. The plating material can be a metal resistant to oxidization such as gold, nickel, and copper, tin, zinc, silver, or the like may be also used as the plating material. The plating material is not limited to those. It is also preferable to plate the outer circumferential surface of external electrode 21A.

2nd Embodiment

Figure 3A:
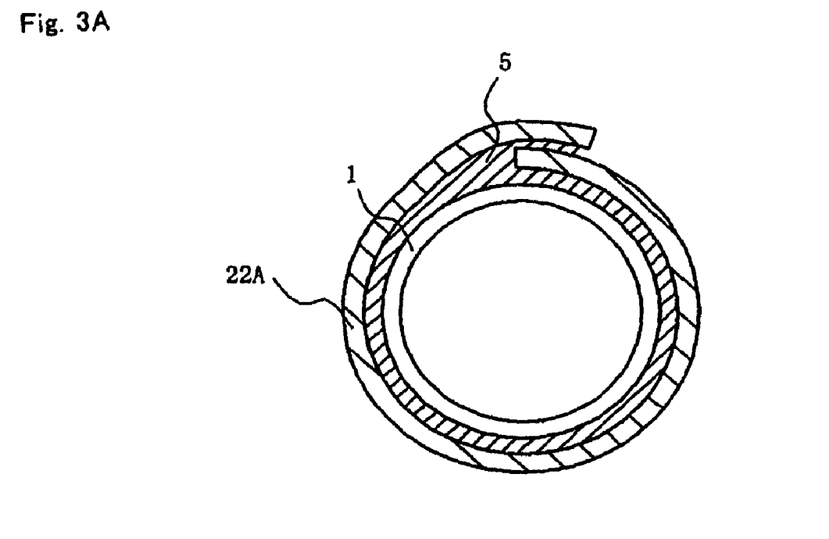
FIG. 3A is a transverse cross-sectional view of an external-electrode discharge lamp according to a second embodiment of the present invention.
Figure 3B:
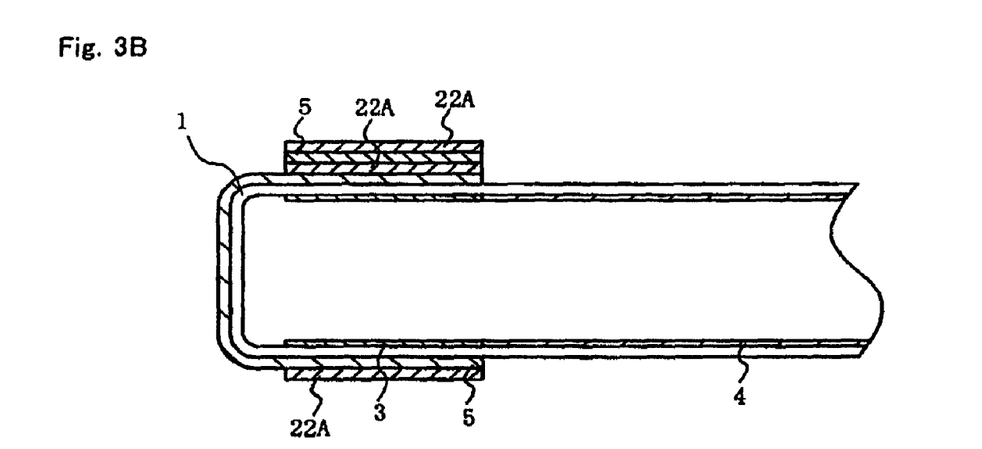
FIG. 3B is a longitudinal cross-sectional view of the external-electrode discharge lamp shown in FIG. 3A.

FIG. 3A shows in transverse cross section an external-electrode discharge lamp according to a second embodiment of the present invention. FIG. 3B is a longitudinal cross-sectional view of the external-electrode discharge lamp shown in FIG. 3A. In FIG. 3A, protective layers 3 on the inner surface of glass bulb 1 are omitted from illustration.

The external-electrode discharge lamp according to the second embodiment is similar to the external-electrode discharge lamp according to the first embodiment in that it has ring-shaped external electrodes 22A with overlapping ends, but differs therefrom in that solder layer 5 is interposed between each external electrode 22A and glass bulb 1.

As described above, if a C-shaped external electrode is simply fitted over a glass bulb or a metal foil is used as a base for a C-shaped external electrode, as with the conventional structures, then since the external electrode is held only in mechanical contact with the glass bulb or the metal foil, the external electrode tends to have irregular contact with the glass bulb or the metal foil. According to the present embodiment, external electrode 22A and glass bulb 1 are joined to each other based on the wetting of a solder, and hence the contact between external electrode 22A and glass bulb 1 suffers less irregularities than if they are held only in mechanical contact with each other.

Solder layer 5 is placed on glass bulb 1 and hence exposed to ultraviolet radiation. However, solder layer 5 is not deteriorated by ultraviolet rays because it is made of metal. Therefore, the contact between external electrode 22A and glass bulb 1 will not be impaired with time unlike the conventional structure in which the external electrode is secured to the glass bulb by a tackiness agent containing an organic resin or an adhesive.

Processes of mounting external electrode 22A according to the present embodiment on glass bulb 1 will be described below.

Figure 4A:
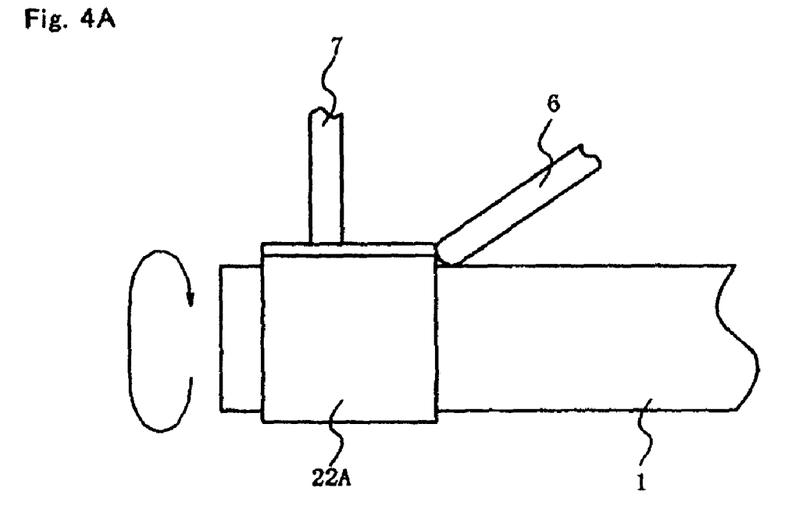
FIG. 4A is a view showing a process of soldering an external electrode of the external-electrode discharge lamp according to the second embodiment.

FIG. 4A shows a process of soldering external electrode 22A according to the present embodiment. As shown in FIG. 4A, ring-shaped external electrode 22A with overlapping ends is fitted over each end of glass bulb 1. Then, the tip end of solder rod 6 is held in abutment against a circumferential edge of external electrode 22A around glass bulb 1, and soldering iron 7 is held in contact with external electrode 22A. While applying heat from soldering iron 7 to external electrode 22A and also applying ultrasonic energy to external electrode 22A, glass bulb 1 is rotated about its own axis. The tip end of solder rod 6 is melted and seeps into the gap between external electrode 22A and glass bulb 1 and also the gap between the overlapping ends of ring-shaped external electrode 22A due to a capillary action. External electrode 22A is now well soldered in place.

While external electrode 22A is being soldered, glass bulb 1 may be held horizontally or vertically. Since external electrode 22A fitted over glass bulb 1 is firmly retained on glass bulb 1 under its own spring resiliency even before it is soldered, external electrode 22A will not slip off glass bulb 1 even when glass bulb 1 is held vertically. Therefore, external electrode 22A on glass bulb 1 that is held vertically can be soldered without fail. The above process of soldering external electrode 22A in place while applying heat to external electrode 22A with soldering iron 7 and also applying ultrasonic energy will be referred to as "ultrasonic soldering process" in the present description.

External electrode 22A may be soldered by another process rather than the ultrasonic soldering process. The other soldering process is illustrated in FIG. 4B.

Figure 4B:
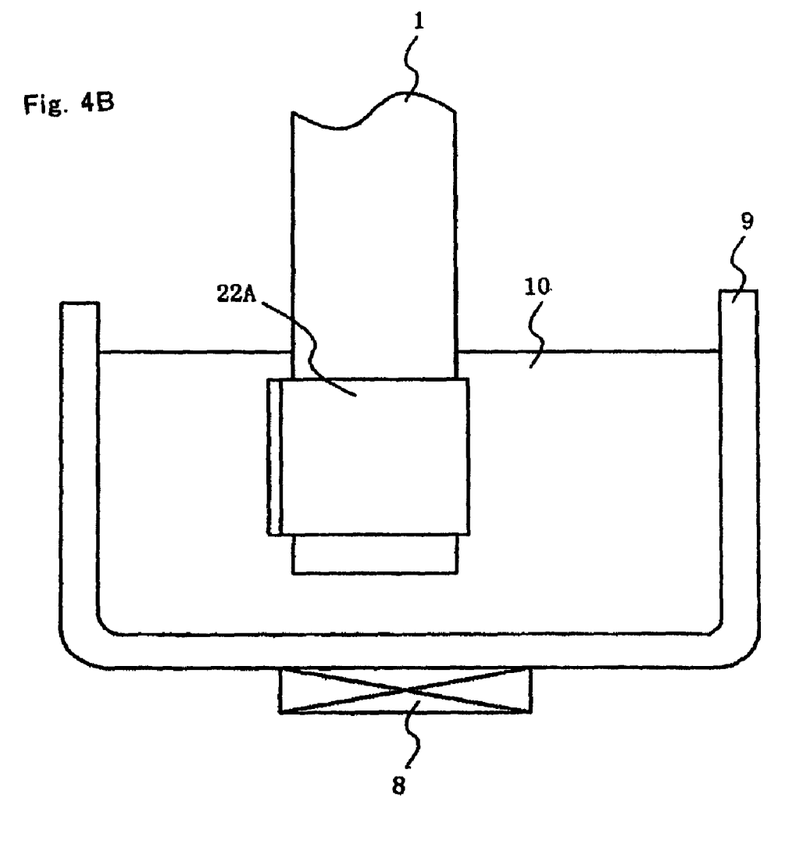
FIG. 4B is a view showing another process of soldering an external electrode of the external-electrode discharge lamp according to the second embodiment.

As shown in FIG. 4B, molten solder 10 is prepared in solder bath 9 combined with ultrasonic vibrator 8. Glass bulb 1 supporting thereon ring-shaped external electrode 22A with overlapping ends is dipped in molten solder 10, and ultrasonic vibrator 8 is energized. Molten solder 10 smoothly seeps into the gap between external electrode 22A and glass bulb 1 and also the gap between the overlapping ends of ring-shaped external electrode 22A, producing solder layer 5 having a thickness of about 100 μm, for example. External electrode 22A is now well soldered in place.

The above process of soldering external electrode 22A in place by dipping external electrode 22A in molten solder 10 in solder bath 9 while applying ultrasonic energy will be referred to as "ultrasonic soldering dip process" in the present description. According to the ultrasonic soldering dip process, solder layer 5 is formed also on the end face of glass bulb 1 as shown in FIG. 3.

In the ultrasonic soldering dip process, glass bulb 1 is dipped in molten solder 10 with its axis being usually oriented vertically. Even though the axis of glass bulb 1 is oriented vertically, since external electrode 22A prior to being soldered is firmly retained on glass bulb 1 under its own spring resiliency, external electrode 22A can be soldered in place without fail.

For soldering external electrode 22A to glass bulb 1 according to the present embodiment, the solder layer may be formed directly on glass bulb 1. Alternatively, a plated layer of metal such as nickel or the like may be preferably formed in advance on the outer surface of glass bulb 1 as a base for the solder layer. According to such an alternative, a better affinity is developed between solder layer 5 and glass bulb 1, allowing external electrode 22A to be well soldered to glass bulb 1.

The solder material that can be used in the above soldering processes will be described in detail below.

The solder material should preferably comprise Sn (tin) as a chief component, 0.2 to 3.0 weight % of Sb (antimony), 0.01 to 0.1 weight % of Al (aluminum), and 0.1 to 10 weight % of Ag (silver). Zn (zinc) may be added as a remaining component to the solder material. In the present embodiment, the solder material contains Sn as a chief component. However, the present invention is not limited to such a composition.

Sb and Al serve to increase the oxide bonding to the outer circumferential surface of the glass bulb which is made of an oxide. Preferably, 0.42 weight % of Sb and 0.025 weight % of Al should be added. Adding 3.0 weight % or less of Sb and 0.1 weight % of Al, with Al being in a small proportion, allows the solder to find its way easily into the gap between glass bulb 1 and external electrode 22A. If 0.2 weight % or more of Sb and 0.01 weight % or more of Al are added, the close contact between glass bulb 1 and external electrode 22A is increased to prevent external electrode 22A from being removed from glass bulb 1.

Ag serves to increase the wettability of the solder, and should preferably be added by 0.6 weight % or less. If 10 weight % or less of Ag is added, the above functions Sb and Al are not lowered, i.e., the oxide bonding is well performed, for preventing external electrode 22A from being removed from glass bulb 1. If Ag is added by more than 0.1 weight %, then it prevents foreign matter such as oxides from remaining on the surface of the solder layer and allows the solder to enter well into external electrode 22A.

According to an example of a ratio of solder components in the present embodiment, the solder material included 97.325 weight % of Sn as a chief component, 1.63 weight % of Zn, 0.42 weight % of Sb, 0.025 weight % of Al, and 0.6 weight % of Ag for best results.

The above solder material according to the present embodiment provides optimum wettability with respect to external electrode 22A and glass bulb 1. Specifically, the solder enters well into the gap between the inner circumferential surface of external electrode 22A and the outer circumferential surface of glass bulb 1 due to a capillary action, forming solder layer 5 of substantially uniform thickness substantially fully in the gap. The solder material is also effective to prevent oxides on the surface of external electrode 22A from remaining on the surface of the solder when external electrode 22A dipped in molten solder 10 is pulled out of molten solder 10, thereby allowing solder layer 5 to have a good smooth surface.

The above solder material is preferably used in a structure in which a current conducting layer is formed as an external electrode on the outer circumferential surface of a glass bulb by the ultrasonic soldering dip process, e.g., an external-electrode discharge lamp disclosed in Japanese laid-open patent publication No. 2004-146351. The solder material with the above component ratio provides good wettability when used to form an external electrode according to the ultrasonic soldering dip process. Thereby, when the glass bulb and the external electrode are dipped in the solder bath, the solder layer is formed to a substantially uniform thickness. Further, since foreign matter such as oxides is prevented from remaining on the outer circumferential surface of the dipped solder layer, surface irregularities due to oxides are prevented from being formed on the outer circumferential surface thereof. The outer circumferential surface of the external electrode is of increased flatness, so that the external electrode is prevented from being peeled off and the glass bulb is prevented from being damaged by surface irregularities due to oxides. Connectors for supplying electric power to the external electrode can be brought into good electric contact with the external electrode. The external electrode can thus be manufactured with increased productivity and yield.

As with the first embodiment, a plated layer of metal should preferably be formed on the inner circumferential surface of external electrode 22A. According to the present embodiment, since the inner circumferential surface of external electrode 22A is soldered and not directly exposed to air, the inner circumferential surface of external electrode 22A is less susceptible to oxidization. The plated layer of metal formed on the inner circumferential surface has a function of allowing the solder to have better wettability when external electrode 22A is soldered. Consequently, when external electrode 22A on glass bulb 1 is dipped in solder bath 9 or the solder melted by soldering iron 7 enters from the edges of external electrode 22A into the gap between external electrode 22A and glass bulb 1, the solder can smoothly seep into the gap between external electrode 22A and glass bulb 1. As a result, the soldering process is facilitated and the soldered joint is highly reliable.

If the solder material has a component ratio with Sn as a chief component, then the plated layer on the inner circumferential surface of external electrode 22A should preferably be made of Sn whose specific gravity is substantially the same as the solder material. The plated layer of Sn reduces adverse effects that may occur when it is melted. If a plated layer of metal is similarly formed on the outer circumferential surface of external electrode 22A, then a solder layer of uniform thickness can be applied to the outer circumferential surface of external electrode 22A.

In the present embodiment, external electrode 22A is joined to glass bulb 1 by the solder. However, external electrode 22A may be joined to glass bulb 1 by a brazing material which is not classified as a solder material. Generally, external electrode 22A can be joined to glass bulb 1 by brazing.

3rd Embodiment

Figure 5A:
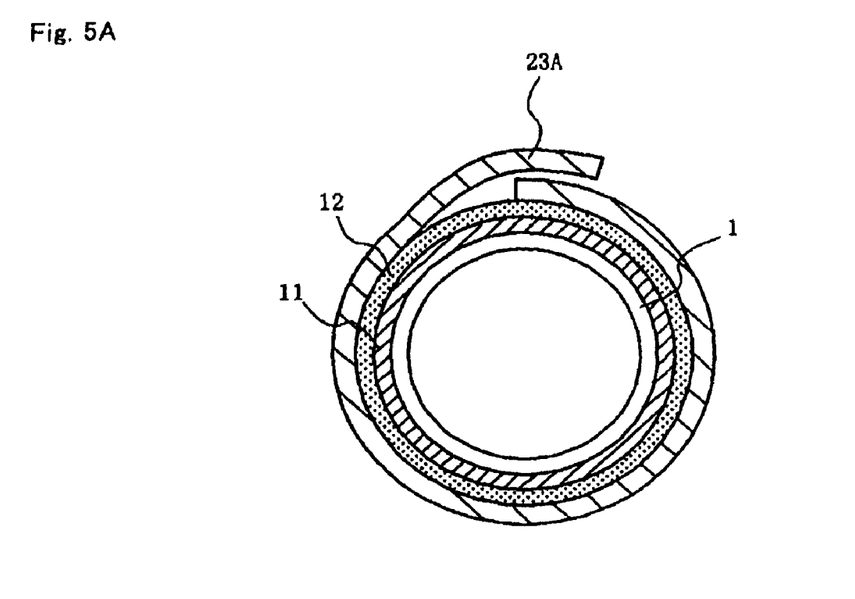
FIG. 5A is a transverse cross-sectional view of an external-electrode discharge lamp according to a third embodiment of the present invention.
Figure 5B:
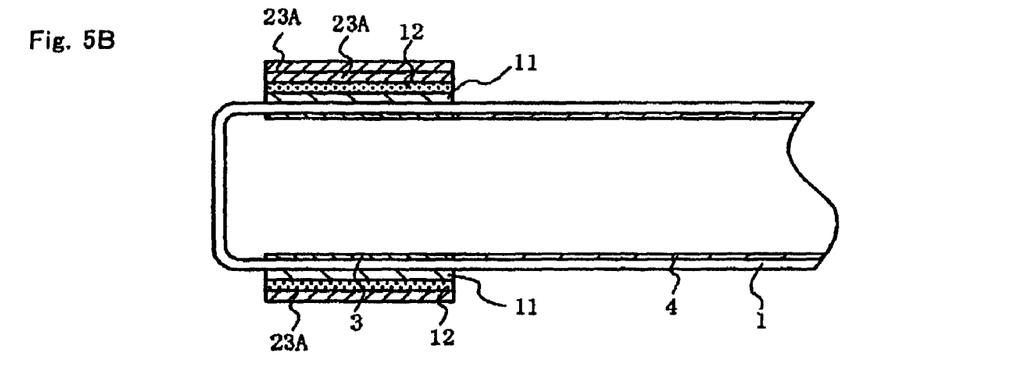
FIG. 5B is a longitudinal cross-sectional view of the external-electrode discharge lamp shown in FIG. 5A.

FIG. 5A shows in transverse cross section an external-electrode discharge lamp according to a third embodiment of the present invention. FIG. 5B is a longitudinal cross-sectional view of the external-electrode discharge lamp shown in FIG. 5A. In FIG. 5A, protective layers 3 on the inner surface of glass bulb 1 are omitted from illustration.

The external-electrode discharge lamp according to the third embodiment is similar to the external-electrode discharge lamps according to the first and second embodiments in that it has ring-shaped external electrodes 23A with overlapping ends, but differs therefrom in that uninterrupted metal layer 11 extending circumferentially on and around glass bulb 1 and adhesive layer 12 extending on and around metal layer 11 are interposed between each external electrode 23A and glass bulb 1, external electrode 23A being fixedly bonded to glass bulb 1.

According to the third embodiment, external electrode 23A is bonded to glass bulb 1 by adhesive layer 12, thus avoiding contact irregularities which would otherwise be caused if ring-shaped external electrode 23A of metal and glass bulb 1 were merely held in mechanical contact with each other.

Since metal layer 11 is disposed as a base for adhesive layer 12, ultraviolet rays radiated from glass bulb 1 are blocked by metal layer 11, preventing adhesive layer 12 from being directly exposed to ultraviolet rays. Consequently, unlike the conventional structure in which the glass bulb is directly coated with a tackiness agent or an adhesive containing an organic resin, adhesive layer 12 is prevented from being deteriorated by ultraviolet rays, and the contact between external electrode 23A and glass bulb 1 will not be impaired with time.

External electrode 23A according to the present embodiment is mounted on glass bulb 1 as follows: Metal layer 11 is formed on glass bulb 1, and then adhesive layer 12 is formed on metal layer 11. Thereafter, external electrode 23A is fixedly bonded by adhesive layer 12. Adhesive layer 12 may be either electrically conductive or electrically nonconductive. In view of the electric resistance of the electrode, however, adhesive layer 12 should preferably be electrically conductive.

Metal layer 11 should preferably be made of a metal which is highly resistant to oxidization and can be held in close contact with glass, such as nickel, for example. However, metal layer 11 may be made of any of various metals other than nickel. Generally, metal layer 11 may be made of a light-impermeable electrically conductive material.

Metal layer 11 may be grown by an electrochemical deposition process such as plating or a physical deposition process such as sputtering or vacuum evaporation. Alternatively, a solder layer formed by the above ultrasonic soldering process or ultrasonic soldering dip process may be used as metal layer 11. In addition, a solder layer may be placed on metal layer 11 as a base.

4th Embodiment

Figure 6A:
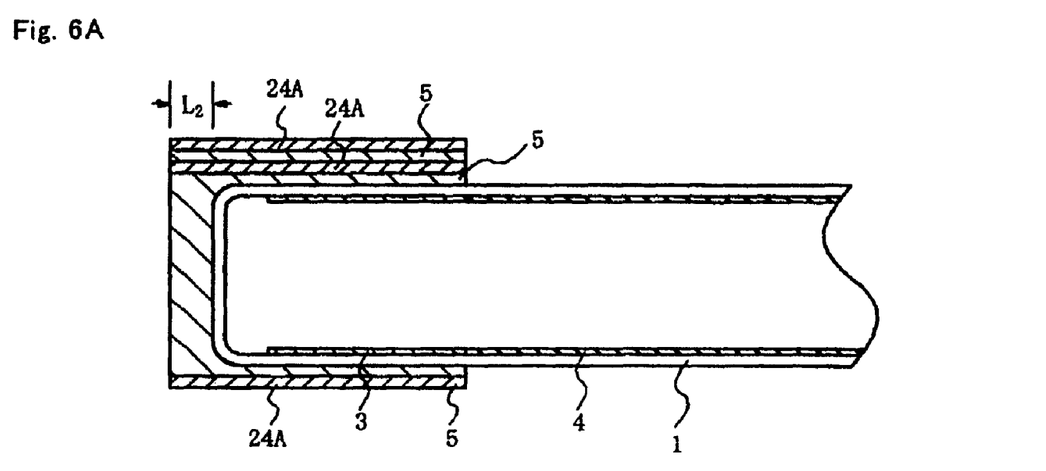
FIG. 6A is a longitudinal cross-sectional view of an external-electrode discharge lamp according to a fourth embodiment of the present invention.
Figure 6B:
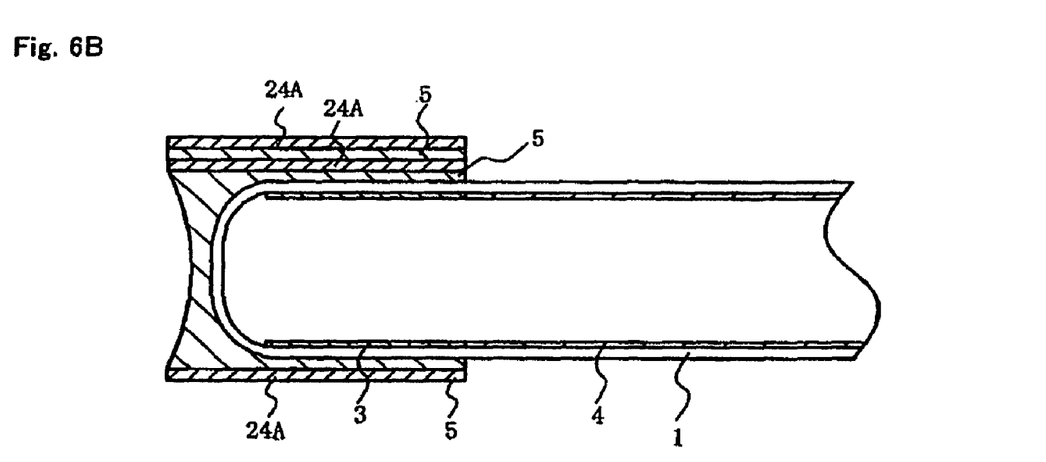
FIG. 6B is a longitudinal cross-sectional view of a modification of the external-electrode discharge lamp according to the fourth embodiment.

FIG. 6A shows in longitudinal cross section an external-electrode discharge lamp according to a fourth embodiment of the present invention. The external-electrode discharge lamp according to the fourth embodiment is similar to the external-electrode discharge lamp according to the second embodiment in that it has ring-shaped external electrode 24A with overlapping ends and ring-shaped external electrode 24A is soldered to glass bulb 1, but differs therefrom in that external electrode 24A has an end face projecting outwardly axially from the end face of glass bulb 1.

With the above structure, the thickness of solder layer 5 formed on the end face of glass bulb 1 is greater depending on the distance L2 by which external electrode 24A projects from the end face of glass bulb 1, than if external electrode 24A does not project from the end face of glass bulb 1. The increased thickness of solder layer 5 results in an increased heat radiating capability for radiating generated heat even if glass bulb 1 is of a small diameter.

The surface of solder layer 5 formed on the end face of glass bulb 1 may not be flat, but may be of an arcuate cross section as shown in FIG. 6A. With this structure, the thickness of solder layer 5 formed on the end face of glass bulb 1 is sufficiently large in a region where the surface of solder layer on the end face of glass bulb 1 starts to be curved from the projecting end of external electrode 24A, providing an increased heat radiating capability.

5th Embodiment

Figure 7A:
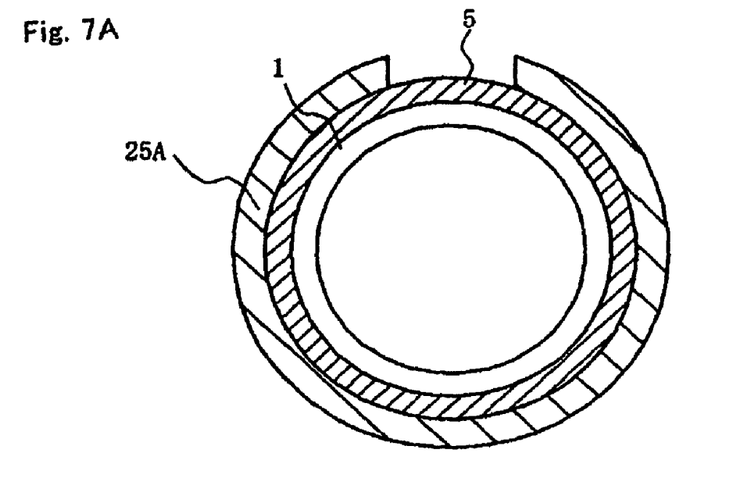
FIG. 7A is a transverse cross-sectional view of an external-electrode discharge lamp according to a fifth embodiment of the present invention.
Figure 7B:
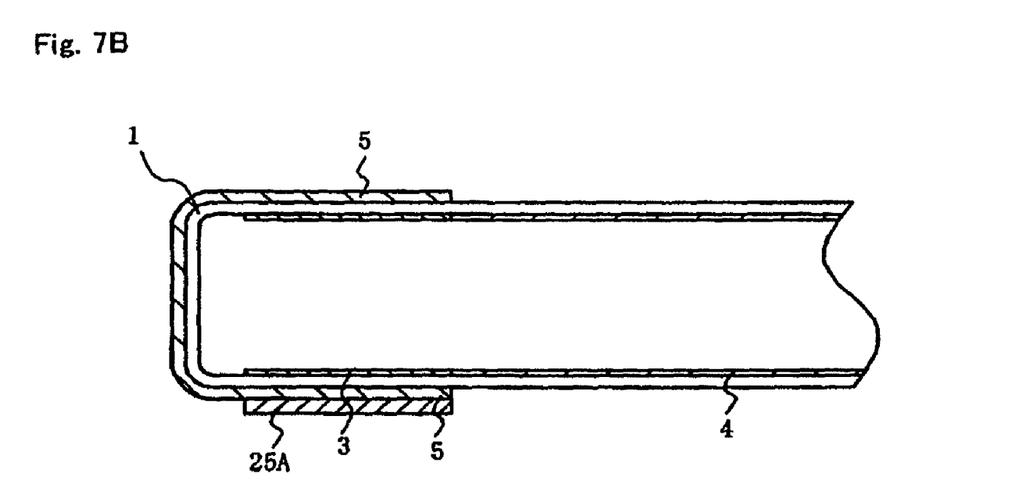
FIG. 7B is a longitudinal cross-sectional view of the external-electrode discharge lamp shown in FIG. 7A.

FIG. 7A shows in transverse cross section an external-electrode discharge lamp according to a fifth embodiment of the present invention. FIG. 7B is a longitudinal cross-sectional view of the external-electrode discharge lamp shown in FIG. 7A. In FIG. 7A, protective layers 3 on the inner surface of glass bulb 1 are omitted from illustration.

The external-electrode discharge lamp according to the fifth embodiment is similar to the external-electrode discharge lamp according to the second embodiment in that external electrode 25A is soldered to glass bulb 1 using the same solder material as the solder material according to the second embodiment, but differs therefrom in that it employs C-shaped external electrode 25A, rather than ring-shaped external electrode 22A with overlapping ends according to the second embodiment. C-shaped external electrode 25A is formed by bending a metal strip of 42 alloy or KOV into a round ring of circular cross section. Before external electrode 25A is placed on glass bulb 1, the inside diameter of ring-shaped external electrode 25A is smaller than the outside diameter of glass bulb 1. When placed on glass bulb 1, ring-shaped external electrode 25A is spread radially outwardly. External electrode 25A is, at least after being mounted on glass bulb 1, of C-shaped cross section with the metal strip ends spaced from each other, as shown in FIG. 7A.

In the present embodiment, solder layer 5 serving as a base for joining external electrode 25A to glass bulb 1 is disposed circumferentially on glass bulb 1. Though external electrode 25A is of C-shaped cross section, light radiated from glass bulb 1 is blocked by solder layer 5 and prevented from leaking out through the gap in the C shape of external electrode 25A.

Moreover, inasmuch as external electrode 25A is soldered to glass bulb 1, no irregularities are present in the contact between external electrode 25A and glass bulb 1 unlike the conventional C-shaped external electrode that is simply fitted over the glass bulb and held only in mechanical contact with the glass bulb. Because solder layer 5 is not deteriorated by ultraviolet rays, the contact between external electrode 25A and glass bulb 1 will not be impaired with time unlike the conventional structure in which the external electrode is secured to the glass bulb by a tackiness agent or an adhesive containing an organic resin.

As with the case of the second embodiment, external electrode 25A according to the fifth embodiment is assembled on glass bulb 1 as follows: First, external electrode 25A is fitted over glass bulb 1. Then, a solder is introduced into the gap between external electrode 25A and glass bulb 1 according to the ultrasonic soldering process or the ultrasonic soldering dip process, forming solder layer 5.

The inside diameter of C-shaped external electrode 25A is initially smaller than the outside diameter of glass bulb 1. When C-shaped external electrode 25A is mounted on glass bulb 1, external electrode 25A is firmly retained on glass bulb 1 under its own spring resiliency. Therefore, even if glass bulb 1 is oriented vertically when external electrode 25A is soldered to glass bulb 1, external electrode 25A is prevented from slipping off glass bulb 1, and can be soldered to glass bulb 1 efficiently.

According to the present embodiment, solder layer 5 disposed circumferentially on glass bulb 1 blocks light emitted from glass bulb 1, thereby eliminating any light leakage through external electrode 25A.

6th Embodiment

An external-electrode discharge lamp according to a sixth embodiment has a C-shaped external electrode of metal similar to the external electrode according to the fifth embodiment. According to the sixth embodiment, the external electrode is bonded to the glass bulb by a metal layer and an adhesive layer which are used as a base. Therefore, the external-electrode discharge lamp according to the sixth embodiment differs from the external-electrode discharge lamp according to the fifth embodiment in that an uninterrupted metal layer extending circumferentially on and around the glass bulb is disposed on the outer surface of the glass bulb, and the metal layer is coated with an adhesive layer.

In the present embodiment, though the external electrode is of C-shaped cross section, light radiated from the glass bulb is blocked by the metal layer serving as a base for the external electrode, and prevented from leaking out through the gap in the C shape of the external electrode. As the adhesive layer is not exposed to ultraviolet rays from the glass bulb, the adhesive layer is not deteriorated. The adhesive layer is effective to reduce irregularities in the contact between the external electrode and the glass bulb which otherwise be caused if an external electrode formed from a metal strip were simply fitted over and merely held in mechanical contact with the glass bulb.

7th Embodiment

Figure 8A:
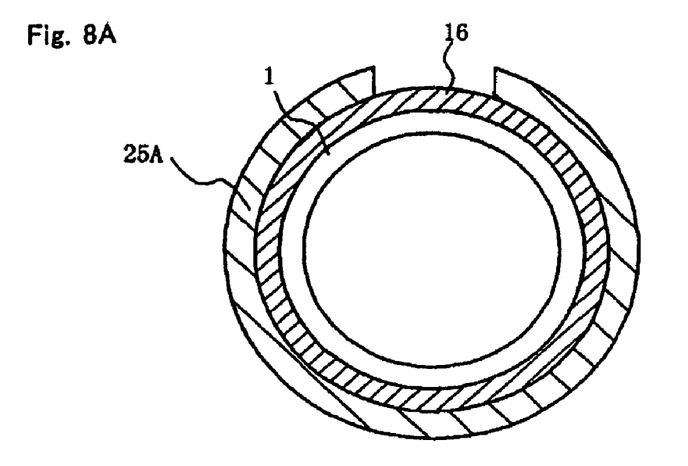
FIG. 8A is a transverse cross-sectional view of an external-electrode discharge lamp according to a seventh embodiment of the present invention.
Figure 8B:
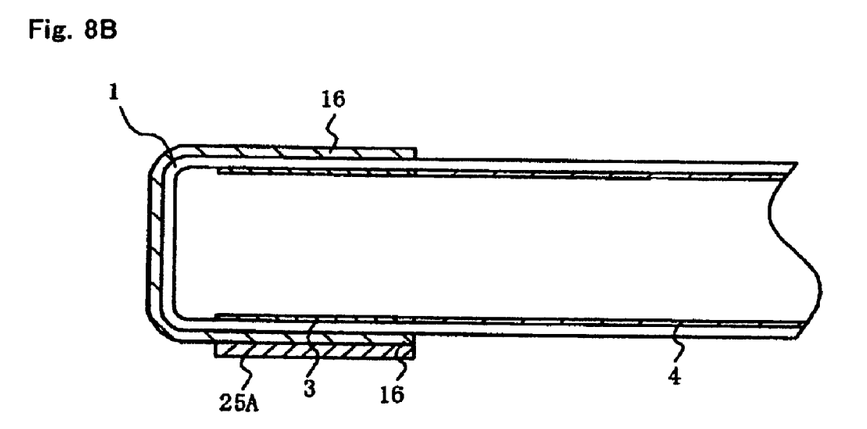
FIG. 8B is a longitudinal cross-sectional view of the external-electrode discharge lamp shown in FIG. 8A.

FIG. 8A shows in transverse cross section an external-electrode discharge lamp according to a seventh embodiment of the present invention. FIG. 8B is a longitudinal cross-sectional view of the external-electrode discharge lamp shown in FIG. 8A. In FIG. 8A, protective layers 3 on the inner surface of glass bulb 1 are omitted from illustration, as with FIG. 2B.

The external-electrode discharge lamp according to the seventh embodiment is similar to the external-electrode discharge lamps according to the fifth and sixth embodiments in that it employs C-shaped external electrode 25A, but differs therefrom in that external electrode 25A is bonded to glass bulb 1 by inorganic adhesive layer 16. Inorganic adhesive layer 16 extends uninterruptedly circumferentially on and around glass bulb 1.

Inorganic adhesive layer 16 may be made of "SUMICE-RAM S" (tradename) manufactured by Asahi Chemical Co., Ltd., or "Threebond 3732" (tradename) manufactured by Threebond Co., Ltd. The former adhesive comprises an alkaline liquid binder which, when heated, undergoes a dehydrative condensation reaction and is hardened to bond objects. The latter adhesive comprises a binder of metal alkoxide as a chief component which, when heated, is hardened to bond objects. Irrespective of which adhesive may be used, an end of glass bulb 1 is coated with the inorganic adhesive in a ring pattern, and external electrode 25A is fitted over the inorganic adhesive on glass bulb 1. Then, the assembly is heated to bond external electrode 25A to glass bulb 1. After bonding external electrode 25A to glass bulb 1, inorganic adhesive layer 16 is made of an inorganic material only. Inorganic adhesive layer 16 is electrically insulative and optically impermeable to light including ultraviolet rays.

Inorganic adhesive layer 16 which serves to bond external electrode 25A to glass bulb 1 is disposed as a base for external electrode 25A circumferentially on and around glass bulb 1. According to the present embodiment, therefore, though external electrode 25A is of C-shaped cross section, light radiated from glass bulb 1 is blocked by inorganic adhesive layer 16 and prevented from leaking out through the gap in the C shape of external electrode 25A.

As inorganic adhesive layer 16 is interposed between external electrode 25A and glass bulb 1, irregularities in the contact between external electrode 25A and glass bulb 1 are less than if they are merely in mechanical contact with each other. Unlike the electrically conductive adhesive, the inorganic adhesive is not deteriorated by ultraviolet rays. Therefore, the contact between external electrode 25A and glass bulb 1 will not be impaired with time due to exposure to ultraviolet rays radiated from glass bulb 1 unlike the conventional C-shaped external electrode that is bonded to the glass bulb by the electrically conductive adhesive.

8th Embodiment

Figure 9A:
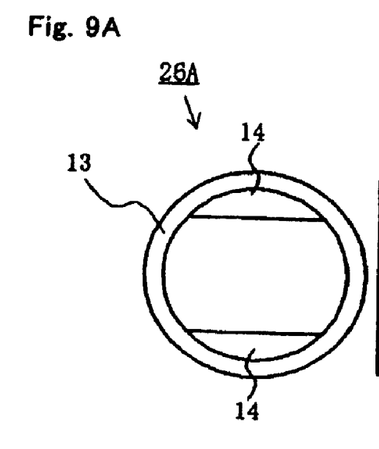
FIG. 9A is a front elevational view of an external electrode according to an eighth embodiment of the present invention.
Figure 9B:
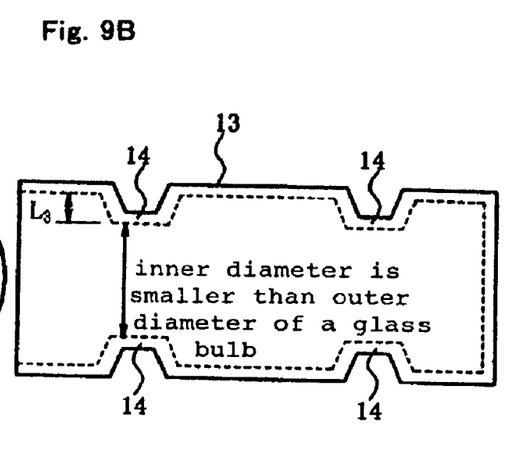
FIG. 9B is a side elevational view of the external electrode shown in FIG. 9A.
Figure 10A:
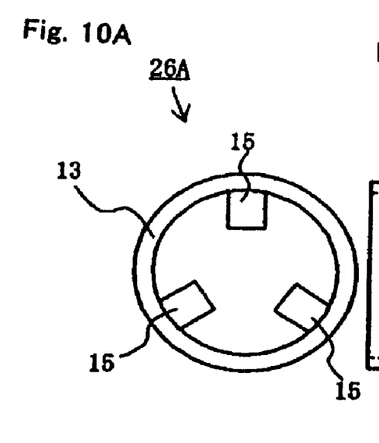
FIG. 10A is a front elevational view of another example of an external electrode according to the eighth embodiment.
Figure 10B:
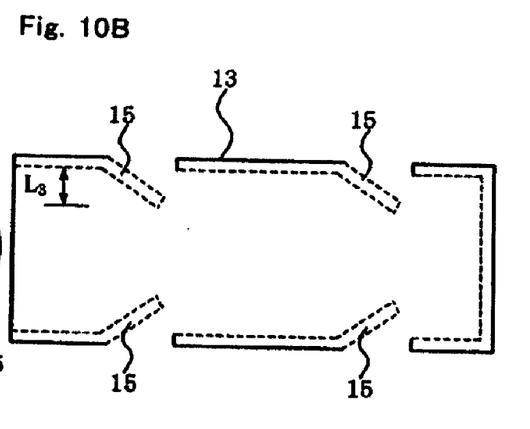
FIG. 10B is a side elevational view of the external electrode shown in FIG. 10A.

FIG. 9A shows in plan an example of external electrode 26A according to an eighth embodiment of the present invention, and FIG. 9B shows in side elevation external electrode 26A shown in FIG. 9A. FIG. 10A shows in plan another example of external electrode 26A according to the eighth embodiment of the present invention, and FIG. 10B shows in side elevation external electrode 26A shown in FIG. 10A. These Figs. show separated external electrode 26A before being mounted on a glass bulb.

External electrode 26A according to the eighth embodiment is generally in the form of fully circumferential hollow cylinder 13 formed from a metal plate. The inside diameter of hollow cylinder 13 of the metal plate is greater than the outside diameter of glass bulb 1. External electrode 26A has protrusions 14, 15 projecting inwardly toward glass bulb 1. In the example shown in FIGS. 9A and 9B, protrusions 14 are formed by reducing the inside diameter of portions of hollow cylinder 13. In the example shown in FIGS. 10A and 10B, protrusions 15 are formed by slitting side walls of hollow cylinder 13 to form three-sided rectangular tongues therein, and bending the three-sided rectangular tongues inwardly into hollow cylinder 13. Protrusions 15 are provided in a plurality of axially spaced sets, i.e., two axially spaced sets in FIG. 10B, each comprising a plurality of circumferentially spaced aligned protrusions 15, i.e., three circumferentially spaced protrusions 15 in FIG. 10A.

Protrusions 14 or 15 project inwardly by a distance L3 which is selected such that the diameter of a circle along the tip ends of protrusions 14 or 15 is smaller than the outside diameter of glass bulb 1 before external electrode 26A is mounted on glass bulb 1. After external electrode 26A is mounted on glass bulb 1, external electrode 26A is firmly retained on glass bulb 1 by protrusions 14 or 15 which press glass bulb 1 under their own spring resiliency.

According to the present embodiment, since external electrode 26A is generally in the form of fully circumferential hollow cylinder 13, light emitted from glass bulb 1 does not leak from external electrode 26A. External electrode 26A can easily be assembled on glass bulb 1 because it may simply be fitted over glass bulb 1 axially from one end thereof.

External electrode 26A may be soldered to glass bulb 1 as with the second embodiment (see FIGS. 2A through 2C). If external electrode 26A is soldered to glass bulb 1, then it is possible to reduce irregularities in the contact between external electrode 26A and glass bulb 1 which otherwise be caused if an external electrode formed from a metal plate were simply fitted over and merely held in mechanical contact with the glass bulb. For soldering external electrode 26A to glass bulb 1 according to the present embodiment, the external electrode 26A may be preferably fitted over glass bulb 1, and then a solder may be introduced into the gap between external electrode 26A and glass bulb 1 according to the ultrasonic soldering process or the ultrasonic soldering dip process, as with the second embodiment.

As with the third embodiment (see FIGS. 5A and 5B), external electrode 26A may be bonded to glass bulb 1 by adhesive layer 12 disposed as a base on metal layer 11 which is disposed on the outer circumferential surface of glass bulb 1. With this arrangement, irregularities in the contact between external electrode 26A and glass bulb 1 can be reduced. Metal layer 11 prevents the adhesive from being deteriorated with time by ultraviolet rays, so that the contact between external electrode 26A and glass bulb 1 is prevented from being impaired with time.

While preferred embodiments of the present invention have been described using specific terms, such description is for illustrative purposes only, and it is to be understood that changes and variations may be made without departing from the spirit or scope of the following claims.

For example, the external electrodes according to the first through eighth embodiments are substantially cylindrical in shape and has axially opposite open ends. The present invention is not limited to such a structure. An external electrode may be of a cap-shaped structure having a closed end near an end face of the glass bulb. Such an external electrode provides an increased heat radiation area for a better heat radiation capability.

The present invention is not limited to a mercury discharge lamp containing mercury vapor in a gas serving as a discharge medium, as seen from the afore descriptions. Fluorescent layer 4, protective layers 3, their materials, and their types have no direct bearing on the present invention.

The external-electrode discharge lamp according to the present invention may be of a flat-plate structure rather than the illustrated structures employing the cylindrical outer casing (glass bulb 1). The external-electrode discharge lamp of the flat-plate structure generally comprises two glass plates spaced from each other, with a discharge space defined therebetween, and a pair of external electrodes disposed on the respective outer surfaces of the glass plates. In the external-electrode discharge lamp of the flat-plate structure, the external electrodes formed from metal plates may be soldered to the glass plates or bonded to the glass plates by an inorganic adhesive. The adhesive bonding makes it possible to reduce contact irregularities which would otherwise be caused if the external electrodes and the glass plates were merely held in direct mechanical contact with each other. The contact between the outer casing and the external electrodes is prevented from being impaired by ultraviolet rays radiated from the discharge space.

What is claimed is:

1. A method of manufacturing an external-electrode discharge lamp, comprising the steps of:

preparing a cylindrical glass bulb having a closed hollow space defined therein with a discharge medium sealed therein, and an external electrode disposed on an outer surface of each of opposite ends of said glass bulb for causing a dielectric barrier discharge in said discharge medium, said external electrode comprising a plate of an electrically conductive material having a portion extending circumferentially on and along said glass bulb and capable pressing said glass bulb under spring resiliency thereof;

mounting said external electrode on an outer circumferential surface of said glass bulb by causing said external electrode to press said glass bulb under the spring resiliency thereof; and after said external electrode is mounted on the outer circumferential surface of said glass bulb, introducing a solder material into a gap between said external electrode and said glass bulb to solder said external electrode to said glass bulb, wherein said solder material is introduced into the gap between said external electrode and said glass bulb according to an ultrasonic soldering process or an ultrasonic soldering dip process.

2. The method according to claim 1, wherein said solder material comprises Sn as a chief component, 0.2 to 3.0 weight % of Sb, 0.01 to 0.1 weight % of Al, and 0.1 to 10 weight % of Ag.

3. The method according to claim 1, wherein said solder material additionally includes Zn.

* * * * *